US011118727B2

(12) United States Patent
McKechnie et al.

(10) Patent No.: US 11,118,727 B2
(45) Date of Patent: Sep. 14, 2021

(54) BRACKET ASSEMBLY FOR BRACING TWO STRUCTURES

(71) Applicant: STUDCO AUSTRALIA PTY LTD, Croydon South (AU)

(72) Inventors: Simon McKechnie, Croydon South (AU); Ben Stevens, Croydon South (AU)

(73) Assignee: Studco Australia Pty Ltd., Croydon South (AU)

( * ) Notice: Subject to any disclaimer, the term of this patent is extended or adjusted under 35 U.S.C. 154(b) by 0 days.

(21) Appl. No.: 16/354,625

(22) Filed: Mar. 15, 2019

(65) Prior Publication Data
US 2019/0285224 A1 Sep. 19, 2019

(30) Foreign Application Priority Data
Mar. 16, 2018 (AU) ................. 2018900875

(51) Int. Cl.
| *F16M 13/02* | (2006.01) |
| *F16M 11/18* | (2006.01) |
| *F16M 11/08* | (2006.01) |
| *E04B 9/20* | (2006.01) |
| *E04B 9/12* | (2006.01) |
| *E04B 1/343* | (2006.01) |

(52) U.S. Cl.
CPC ............ *F16M 13/02* (2013.01); *E04B 9/127* (2013.01); *E04B 9/20* (2013.01); *F16M 11/08* (2013.01); *F16M 11/18* (2013.01); *E04B 1/34326* (2013.01); *F16M 2200/08* (2013.01)

(58) Field of Classification Search
CPC ....... E04B 2001/2415; E04B 2001/405; E04B 2001/2644; E04B 1/2608; E04B 9/127; F16M 13/02; F16M 11/18; F16M 11/08; F16M 2200/08
USPC .......................... 52/698–703, 7, 12, 714, 715
See application file for complete search history.

(56) References Cited

U.S. PATENT DOCUMENTS

| 2,191,979 | A | * | 2/1940 | Bierbach | ............... | E04B 5/12 |
| | | | | | | 52/370 |
| 4,449,335 | A | * | 5/1984 | Fahey | .................. | E04B 1/2608 |
| | | | | | | 52/713 |
| 4,498,801 | A | * | 2/1985 | Gilb | ....................... | F16B 9/052 |
| | | | | | | 403/232.1 |
| 5,170,977 | A | * | 12/1992 | McMillan | ............. | E04B 1/2608 |
| | | | | | | 248/300 |
| 5,307,603 | A | * | 5/1994 | Chiodo | ................. | E04B 1/2608 |
| | | | | | | 52/297 |
| 5,653,079 | A | * | 8/1997 | Loeffler | ................ | E04B 1/2608 |
| | | | | | | 403/396 |

(Continued)

*Primary Examiner* — Brian E Glessner
*Assistant Examiner* — Adam G Barlow
(74) *Attorney, Agent, or Firm* — Woods Oviatt Gilman LLP; Katherine H. McGuire, Esq.

(57) ABSTRACT

A bracket assembly (2) for bracing a building component (3, 71) to a building structure (42), the assembly comprising a first connecting portion (4) having at least two protruding portions (6, 8) joined by a joining portion (10), each protruding portion (6, 8) connectable to a respective bracing element (44, 46) and a second connecting portion (12) having at least one depending portion (16, 18) and linked to said first connecting portion (4), said at least one depending portion (16, 18) for connection to said building component (3, 71).

21 Claims, 12 Drawing Sheets

(56) References Cited

U.S. PATENT DOCUMENTS

| | | | | |
|---|---|---|---|---|
| 6,415,575 B1* | 7/2002 | Thompson | E04B 1/2608 52/712 |
| 6,560,943 B1* | 5/2003 | Leek | E04B 7/045 52/295 |
| 6,922,967 B2* | 8/2005 | Collie | E04B 7/045 52/656.9 |
| 7,334,372 B2* | 2/2008 | Evans | E04B 1/2612 52/289 |
| 8,677,718 B2* | 3/2014 | Marshall | E04D 13/1681 52/655.1 |
| 8,966,856 B2* | 3/2015 | Groenesteyn | E04C 5/18 52/657 |
| 9,003,738 B1* | 4/2015 | Evans, Jr. | E04B 1/40 52/702 |
| 9,290,926 B2* | 3/2016 | Sidhu | E04B 5/12 |
| 10,179,992 B2* | 1/2019 | Brekke | E04B 1/2612 |
| 10,233,632 B1* | 3/2019 | Wokutch | E04B 1/2608 |
| 10,273,678 B2* | 4/2019 | Hensen | E04B 1/2608 |
| 10,280,617 B2* | 5/2019 | Monty | F16B 7/0493 |
| 10,294,656 B2* | 5/2019 | Fox | E04B 1/2612 |
| 10,358,811 B1* | 7/2019 | Fox | E04B 1/2604 |
| 2003/0200705 A1* | 10/2003 | Collie | E04B 7/045 52/91.3 |
| 2005/0011157 A1* | 1/2005 | Lutz | E04B 7/045 52/698 |
| 2009/0094931 A1* | 4/2009 | Sanders | E04B 1/41 52/698 |
| 2012/0049022 A1* | 3/2012 | Coyle | E06B 3/04 248/220.21 |
| 2016/0153185 A1* | 6/2016 | Ter-Borch | E06B 1/342 52/204.1 |
| 2016/0251845 A1* | 9/2016 | Evans | F16M 13/027 52/698 |
| 2017/0204600 A1* | 7/2017 | Daudet | E04B 1/2403 |
| 2019/0271146 A1* | 9/2019 | Fox | E04B 1/2604 |

* cited by examiner

BRACKET ASSEMBLY FOR BRACING TWO STRUCTURES

FIELD OF THE INVENTION

This invention relates to a bracket assembly for bracing a building system to a building structure.

BACKGROUND OF THE INVENTION

Ceiling structures generally include a framework which is suspended from a building structure with the framework supporting ceiling tiles or plasterboard linings. In some cases, rooms are divided by walls that are constructed to stop at the ceiling level and are fixed to the ceiling framework instead of passing through the ceiling cavity space and being connected to the building structure at the top. In the event of seismic activity from earthquakes or similar events, it is possible for the ceiling structure and the less-than-full-height walls to move and gain momentum which ultimately causes the ceiling and the walls to fail and collapse, potentially injuring people located in its vicinity and causing damage to the building's fixtures and fittings.

As a result of a number of recommendations and building guidelines and standards, it has been recommended to provide bracing in ceilings and in internal walls to limit the amount of movement that a ceiling mass and internal wall have.

To achieve this, the less than full height walls are generally braced at the head or top of the wall to the underside of the building structure, such as the roof or concrete slab, while a ceiling framework is braced from the top side of the ceiling mass upper roof structure to the underside of the building structure, such as the roof or concrete slab. Bracing the less than full height wall also limits the transfer of movement within the wall structure to the ceiling structure in the event of a seismic occurrence.

Bracing of suspended ceilings and less than full height walls have been performed previously, however such bracing arrangements are generally ad hoc, site-built systems that are built from general site materials, with no specific engineering design to the sections used or the connection methods employed. Thus it was not possible to be sure that the ad hoc bracing systems were fit for purpose or performed adequately in the event of an earthquake until that seismic event actually occurred.

One existing solution to the bracing problem was introduced as a series of brackets which were expensive to purchase. Furthermore there were a number of shortcomings and design flaws that made it difficult and awkward to install the brackets in ceilings and at the head of each internal wall, which added to time and cost to the installation process. Furthermore the bracing orientation of the existing bracket assembly was such that the horizontal web of each bracing member was connected to the bracket in an orientation that did not make the structure as strong as possible. A number of different versions were provided giving different angles of connection to the brace supports so that no variation in angle with one particular bracket was available. Furthermore the bracing clashed with suspension rods so that the bracing and connectors needed to be installed prior to or at the same time as the ceiling was built. The bracket arrangement could have up to four connectors or braces, but with the orientation of the flanges of the bracket there is very little room where all of the ends of the braces met at the connector so that it was difficult to affix screws in holes to connect the braces to the connector. Generally access to this area was very difficult being directly above a top cross rail and the screws had to be fitted in a skewed orientation, which made it difficult for installers and did not provide a full strength connection.

An existing wall brace had similar problems to the above ceiling brace in the prior art and was constructed using a seven piece assembly, which made it susceptible to movement and there was a greater chance of a connection becoming loose. There was also no variation in the bracing angle adjustment as the prior art system has set angles for the flanges for which the braces were connected.

The present invention seeks to overcome any one or more of the above disadvantages by providing a one piece bracket assembly that can be used for connecting an internal wall to a building structure and also to provide bracing for a ceiling structure when connected to the building structure, or both.

SUMMARY OF THE INVENTION

According to an aspect of the invention, there is provided a bracket assembly for bracing a building component to a building structure, the assembly including:

a first connecting portion having at least two protruding portions joined by a joining portion, each protruding portion connectable to a respective bracing element;

a second connecting portion having at least one depending portion and linked to said first connecting portion, said at least one depending portion for connection to said building component.

Preferably a first end of each bracing element is connectable to a respective protruding portion and a second end of each bracing element is connectable to the building structure. Preferably each bracing element, prior to final connection with a respective protruding portion, is rotatable with respect to said respective protruding portion. The rotation may be up to 270 degrees.

Each protruding portion may have a slot to enable adjustment of a bracing element with respect to a respective protruding portion. The bracket assembly can include one or more acoustic mounts.

Preferably, the building component is a less-than-full-height wall or part of a ceiling structure. The bracket assembly may have two protruding portions respectively connectable to a bracing element at said first end of each bracing element, said protruding portions being substantially parallel to one another, and said joining portion joining said protruding portions being substantially perpendicular to said protruding sections.

The bracket assembly may have a bridging member that joins the joining portion to said second connecting portion. The second connecting portion preferably has first and second depending portions joined by a web, with said bridging member attached to or integrally formed with said web, each of the first and second depending portions are attachable to a top section of the less-than-full-height wall. Each of the first and second depending portions may have a slot such that before solid connection of the second connecting portion to the wall top section, the bracket assembly is adjustable in position with respect to the wall top section. The second connecting portion can be substantially planar and the bridging member is substantially perpendicular to the second connecting portion.

The bracket assembly may further include a swivel connecting piece between the first and second connecting portions to enable rotation and a desired angle of alignment between the first and second connecting portions.

Preferably the building component is part of a ceiling structure positioned adjacent to the building structure. Preferably the bracket assembly has at least three protruding portions respectively connectable to a bracing element at said first end of each bracing element, with at least two of the protruding portions being substantially parallel to one another joined by said joining portion, said joining portion being substantially orthogonal to the two protruding sections, a third protruding portion being substantially perpendicular to and connected to one of the other two protruding sections. The second connecting portion is preferably integral with the joining portion, said second connecting portion preferably having first and second depending portions connected to said joining portion through respective first and second segments. Each of the depending portions is preferably substantially perpendicular to said first and second segments and are fixable to a track or bar of the ceiling structure. The joining portion may have a slot to enable adjustment of the bracket assembly with respect to the track or bar.

The bracket assembly preferably has parts that enable connection to the building component where the building component is either part of a ceiling structure or is a less-than-full-height wall. The bracket assembly may include a first extension member extending from said first depending member and a second extension member extending from said second depending member to enable connection of the second connecting portion to a less-than-full-height wall.

BRIEF DESCRIPTION OF THE DRAWINGS

Preferred embodiments of the invention will hereinafter be described, by way of example only, with reference to the drawings in which.

DETAILED DESCRIPTION OF THE PREFERRED EMBODIMENTS

Figure 1:
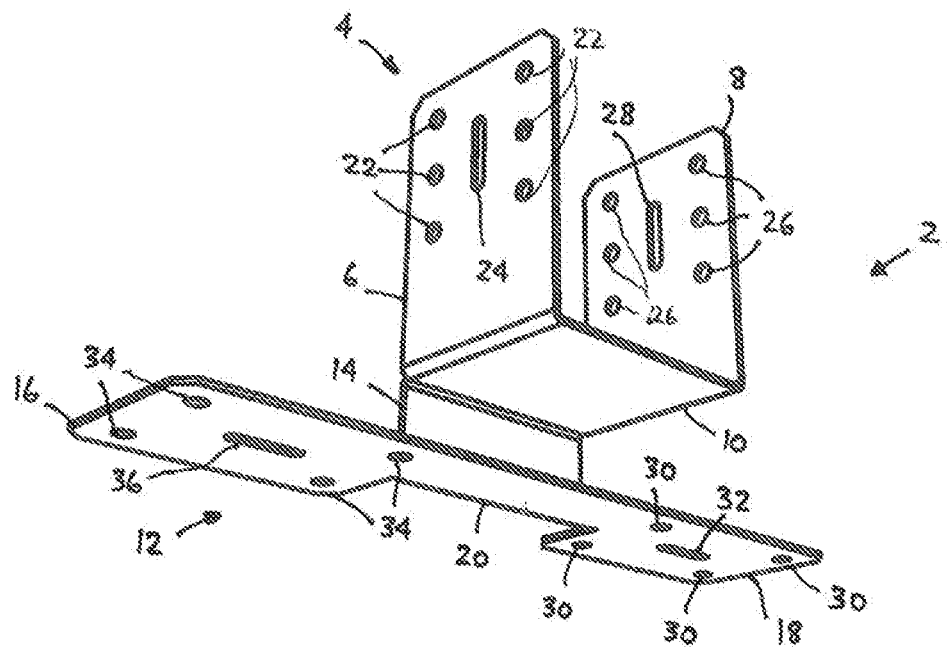
FIG. 1 is a perspective view from below of a bracket assembly according to a first embodiment of the invention.
Figure 2:
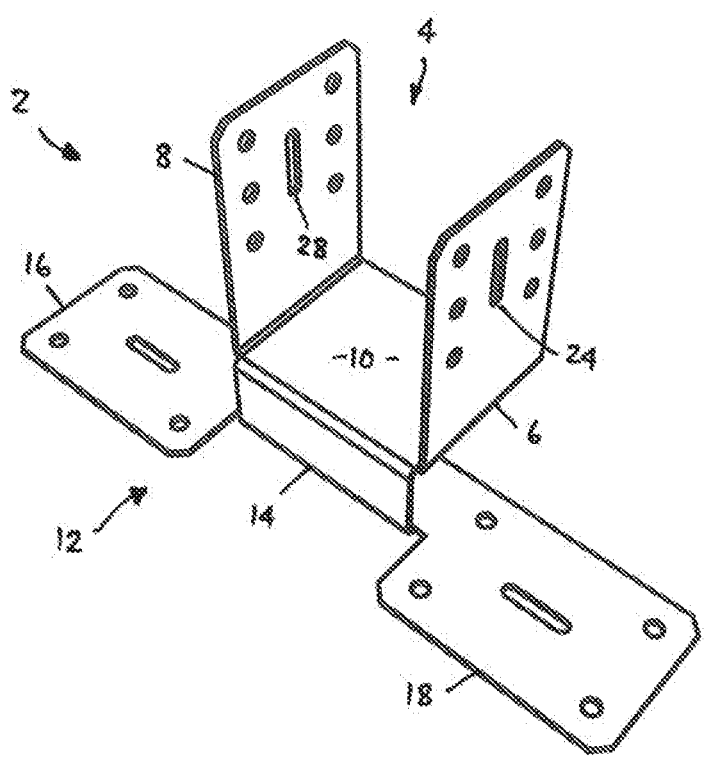
FIG. 2 is a perspective view from above of the bracket assembly of FIG. 1.

Referring to FIGS. 1 and 2 there is shown a bracket assembly 2 used to connect a building component, such as a less-than-full-height wall, to a building structure such as a roof structure, the assembly 2 having a first connecting portion 4 and a second connecting portion 12. Both connecting portions 4, 12 are connected to each other through a bridging member 14. The first connecting portion 4 has provisions to connect to a pair of bracing components (not shown in this figure) and has a first protruding portion 6, a second protruding portion 8 and a third portion or joining portion 10 which connects the first and second protruding portions 6 and 8. Bridging member 14 connects to or is integrally formed with the third (joining) portion 10 as well as to second connecting portion 12. The second connecting portion 12 is designed to connect fixedly to a top section of a less-than-full-height wall using standard fasteners that protrude through apertures 34 and 30. The second connecting portion 12 is made up of a first segment or depending portion 16, a second segment or depending portion 18 and a third thinner segment or web 20 that connects both the first and second depending portions 16 and 18. Portion 12 is generally flat to lie against a top portion of the wall. Elongate slots 32 and 36 are used to locate and temporarily position the second connecting portion 12 so that adjustments can be made where it can slide along the top portion of the wall and then be securely fastened in place, after a position is selected.

The first protruding portion 6 of the first connecting portion 4 is upstanding and is substantially parallel to the second protruding portion 8. Each of portions 6 and 8 have respective elongate slots 24 and 28 through which a fastener can be threaded to allow the location or temporary positioning to a further component, such as a bracing element or beam, and relative adjustment of its position can be made. Once a position of the bracing element is finalised then fasteners can be used through apertures 22 and 26 to finally locate and fix the bracing element to each of the protruding portions 6 and 8.

Figure 3:
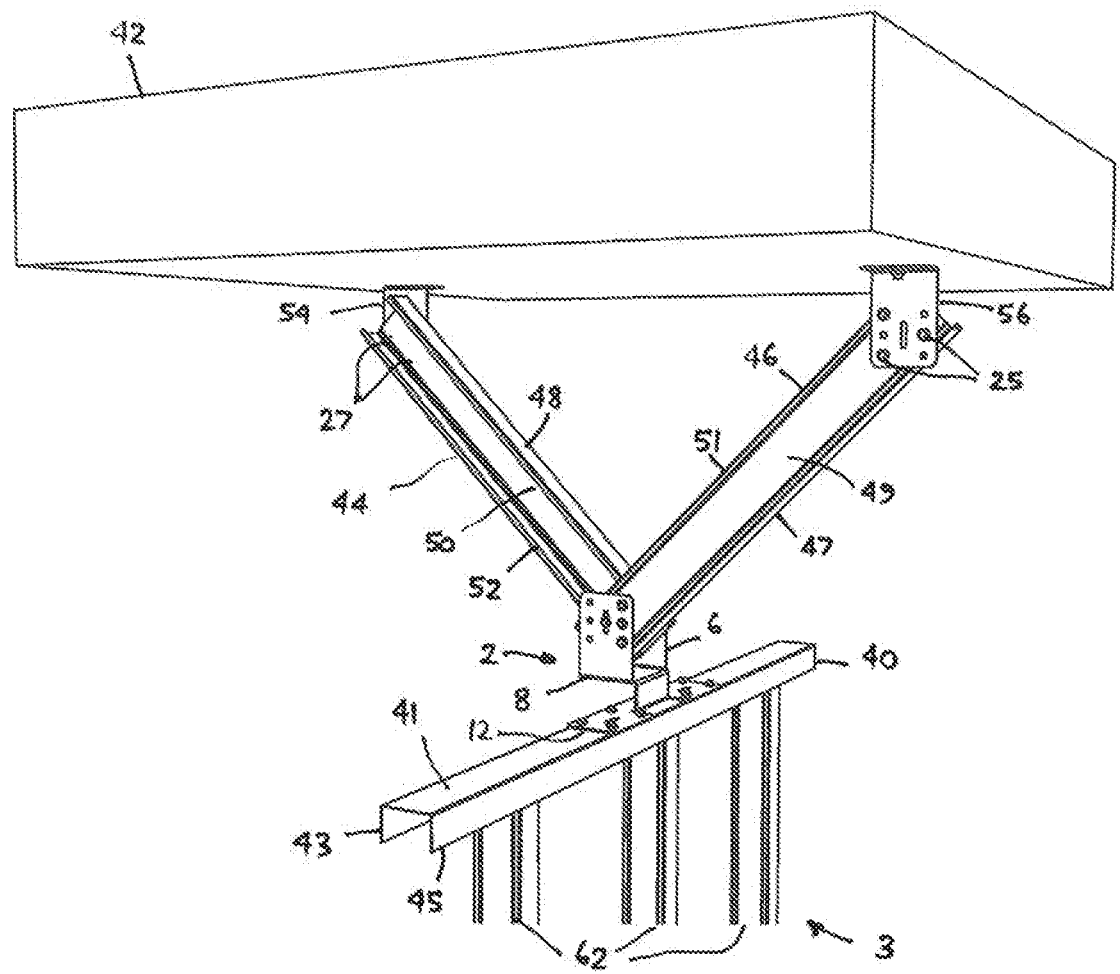
FIG. 3 is a perspective view showing the bracket assembly of FIG. 1 installed and connecting a portion of a top of a less-than-full-height wall to a pair of bracing elements which in turn are connected to a roof structure.
Figure 4:
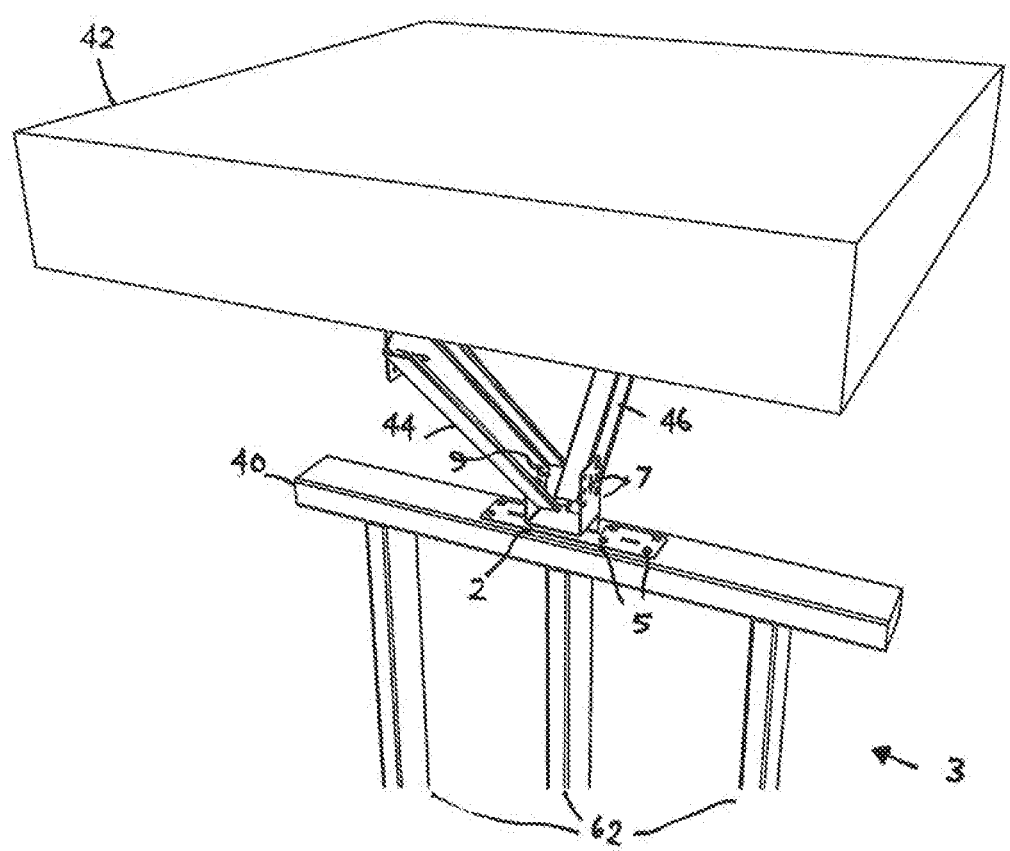
FIG. 4 is a perspective view from above of a bracket assembly as shown in FIG. 1 connected to the top of a timber stud less-than-full-height wall and also connected to bracing components that in turn are connected to a roof structure.

Referring to FIG. 3 and FIG. 4 there is shown bracket assembly 2 fixed in position and connecting a wall structure 3, that is less than full height, to respective bracing elements 44 and 46 which are connected at their outer ends to a building structure 42. Specifically a top track or segment 40, having a web 41 and depending flanges 43, 45, of the wall structure 3, which has depending studs 62 which can either be steel studs as in FIG. 3 or timber studs as in FIG. 4, is connected to the second connecting portion 12 at an outer surface of web 41 through suitable fasteners 5 after the final position of the bracket assembly 2 is determined. The first beam or bracing element 44 is connected through its web 50 to the first upstanding portion 6 through fasteners 9 (FIG. 4).

Prior to this, slot 24 may be used to locate in position the beam 44 with the upstanding first protruding portion 6 as the beam 44 can swivel through an arc of up to 180° in order to locate its outer end with bracket 54, attached to building structure 42. Similarly the beam or bracing element 46 has its web 49 connected to the upstanding second protruding portion 8 through suitable fasteners 7. Prior to this, slot 28 may be used to locate the beam 46 and temporarily hold it in position until the final angle of beam 46 is determined, which can swing through an arc of 180°, before being connected to a respective bracket 56 attached to building structure 42. The fasteners 7 are then secured as are the fasteners 25 at bracket 56. Similarly the fasteners 27 are tightened at bracket 54. Bracket 54 connects to a rod which is securely fixed to the building structure 42, such as a roof structure, while bracket 56 is connected to a further rod again which is also securely fastened to the roof structure 42.

In this manner, and with the stronger part of the bracing elements 44 and 46 being connected to the bracket assembly 2 through their respective webs (or pans) 50 and 49, it provides a very strong bracing arrangement such that in the event of seismic activity it will prolong the effect of holding the wall structure 3 in place and assist in preventing the whole ceiling structure from gaining momentum and eventually collapsing. The bracing elements 44 and 46 can be C-section, box section or U-section in profile.

Figure 5:
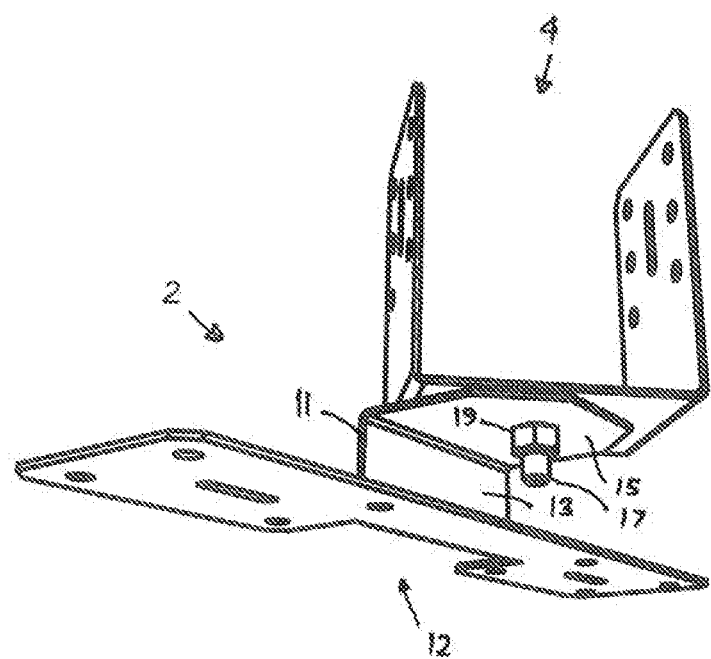
FIG. 5 is a perspective view from below showing an alternative bracket assembly that swivels.

With reference to FIG. 5 there is shown an alternative embodiment in which the second connection portion 12 can swivel or pivot with respect to the first connecting portion 4 to change the angle of alignment between the first connecting portion 4 and the second connecting portion 12. This is particularly advantageous where the first connection portion 4 can be at an angle other than 90° to the second connecting portion 12. It provides a versatile option depending on the orientation of the bracing elements, such as 44 and 46, with respect to a top track for example. The swivel arrangement is enabled though a swivel connecting piece 11 which protrudes from second connection portion 12. It has a downwardly extending part 13 that is integral with the second connecting portion 12 and a transverse portion 15 which abuts against web 10. The piece 11 can be lightly secured, in order to enable the swivel action between the portions 4 and 12 through a bolt 17 and a nut 19. Once the final arrangement is reached then the nut 19 can be tightened and secured.

Figure 6A:
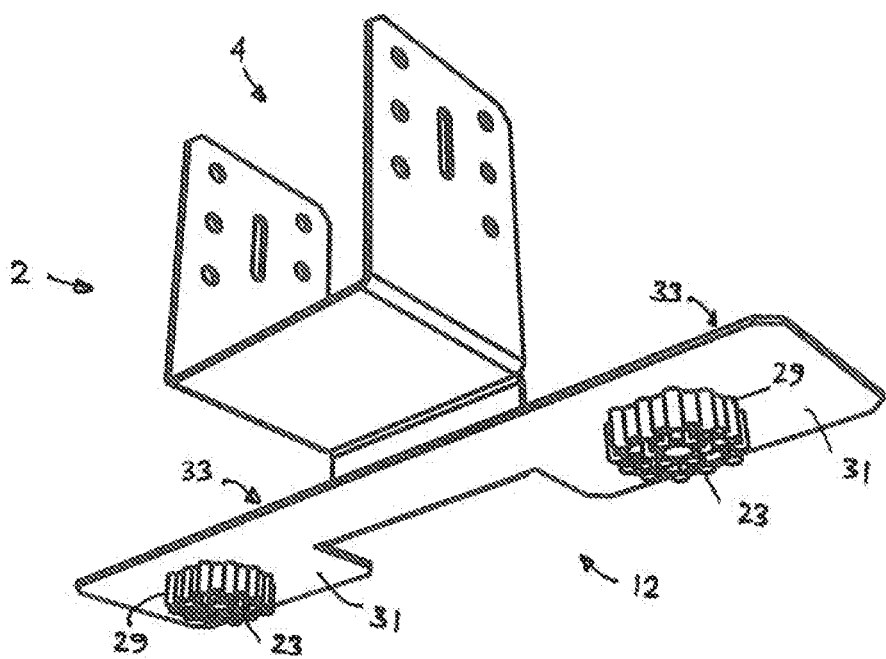
FIG. 6A is a bracket assembly of the embodiment of FIG. 1 showing acoustic components attached in a different position to that shown in FIG. 6.
Figure 6:
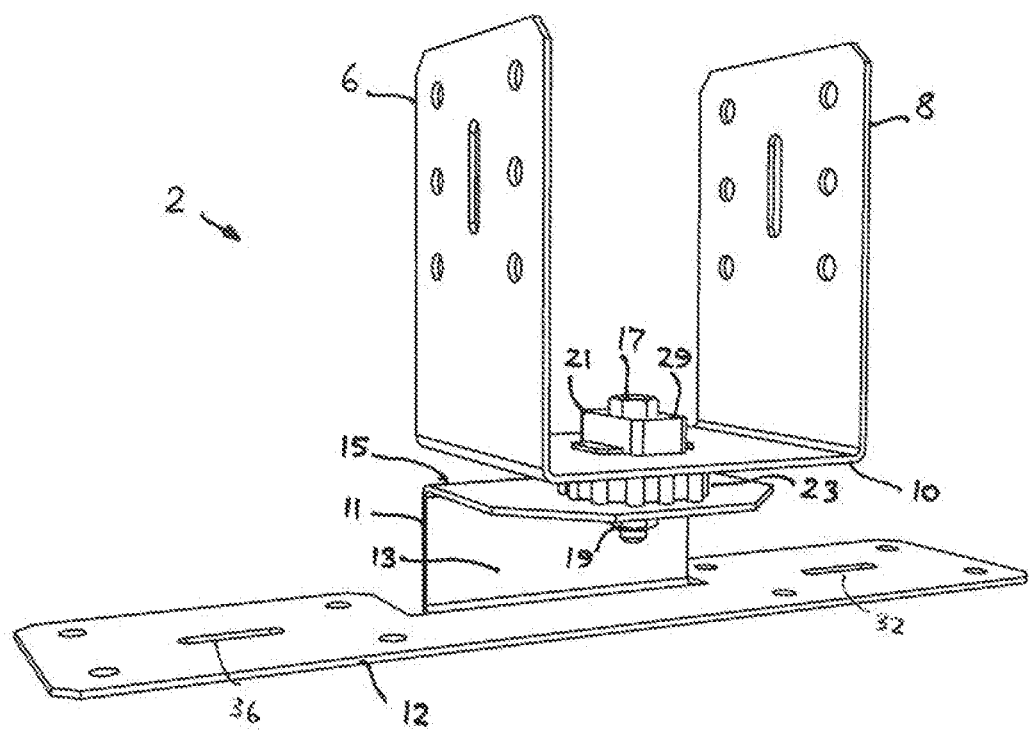
FIG. 6 is a bracket assembly similar to that shown in FIG. 5 but having acoustic components included.

With reference to FIG. 6 there is shown the same arrangement as in FIG. 5 except for the addition of an acoustic mount 29 that is secured through the bolt 17 and nut 19. Specifically there is a first portion 21 of the acoustic mount 29 existing between the head of the bolt 17 and web 10 and a second portion 23 of the acoustic mount 29 existing between the web 10 and transverse portion 15. The acoustic mount 29 can be integral and fit within an appropriate aperture in the web 10 and therefore fit around the bolt 17. A further member (not shown) bridges the first and second portions 21, 23. The mount 29 is primarily designed to prevent any noises or grating between the portion 4 and the portion 12 with its upstanding member 11.

An alternative arrangement is shown in FIG. 6A, where the acoustic mount 29 is fitted to each of the first and second depending portions 16, 18 of second connecting portion 12. The second portion 23 is shown on a lower face 31 of each of portions 16, 18. The first portion 21 of the acoustic mount 29 may or may not be present on the top face 33 of the second connecting portion 12. The portions 23 can be affixed to the portions 16, 18 using a fastener through slots 32 and 36 (see FIG. 1), with or without the corresponding portions 21. FIG. 6A, although shown without the swivel or pivot mechanism of FIG. 5, is equally applicable to the embodiment shown in FIG. 5.

Figure 7:
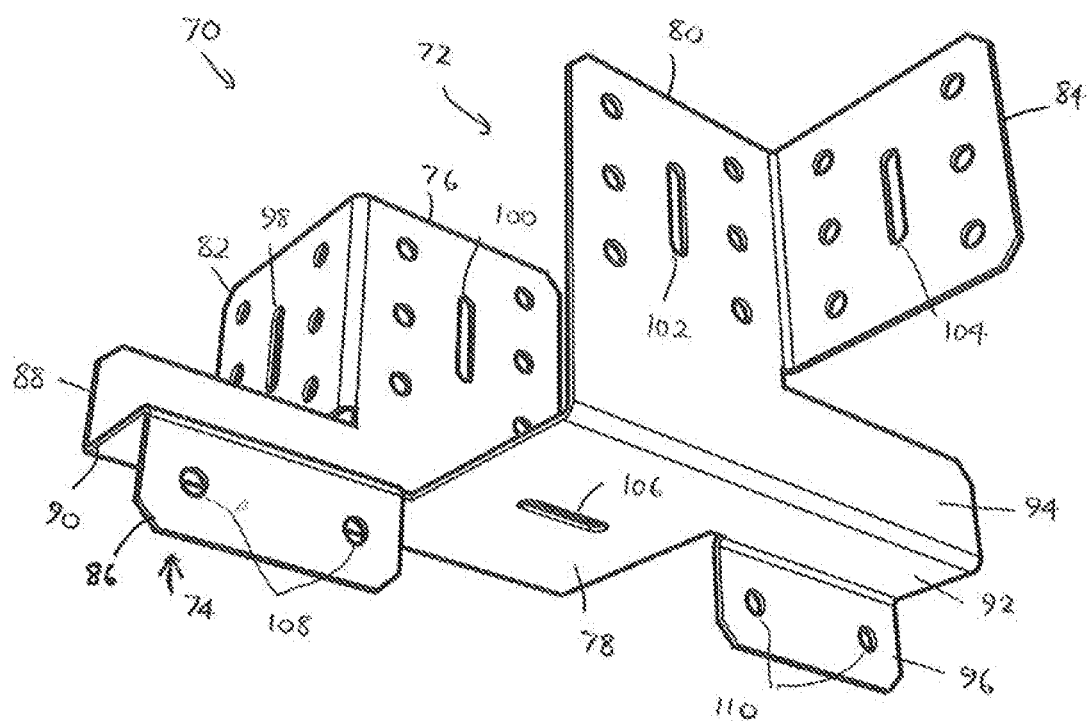
FIG. 7 is a perspective view from below of a further bracket assembly according to another embodiment which is used to connect or brace a concealed ceiling system.
Figure 8:
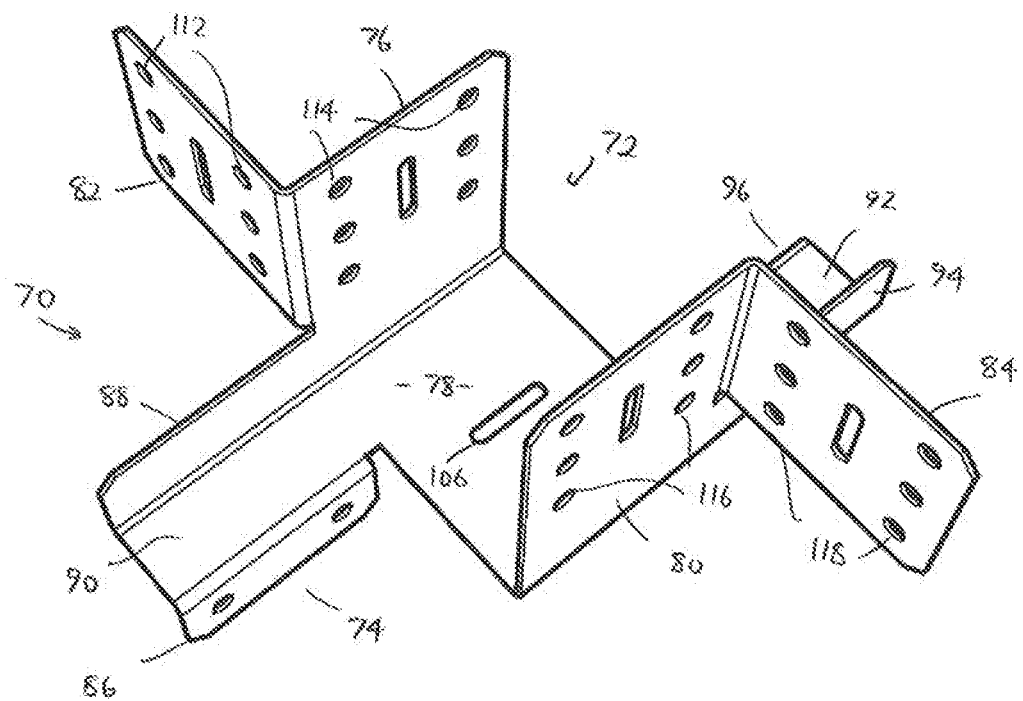
FIG. 8 is a perspective view from above of the bracket assembly in FIG. 7.

Referring to FIGS. 7 and 8 there is shown a further embodiment of the bracket assembly, used to connect a building component, such as a ceiling structure, to a building structure such as a roof structure. Bracket assembly 70 has a first connecting portion 72 and a second connecting portion 74. The first connecting portion 72 has first protruding portion 76 and second protruding portion 80 which are both upstanding and substantially parallel to one another and joined by a joining (third) portion 78 that acts as a web to connect the first and second protruding portions 76, and 80. The second connecting portion 74 includes first depending portion 86 and second depending portion 96 for connection to a building component, to be hereinafter explained. The first depending portion 86 is connected to third (joining) portion 78 through first segment 90 while the second depending portion 96 is connected to the web 78 through second segment 92. Therefore portions 92, 78 and 90 are all integral with each other and are adapted to connect to a building component. A first upstanding flange 88 connects to portion 90 while a second upstanding flange 94 connects to portion 92. Located at right angles to the first protruding portion 76 is third protruding portion 82 while extending substantially perpendicular from second protruding portion 80 is fourth protruding portion 84. Each of the portions 76, 80, 82 and 84 are designed to connect to a bracing element which at its other end is connected to a roof structure, to be hereinafter described.

Figure 7A:
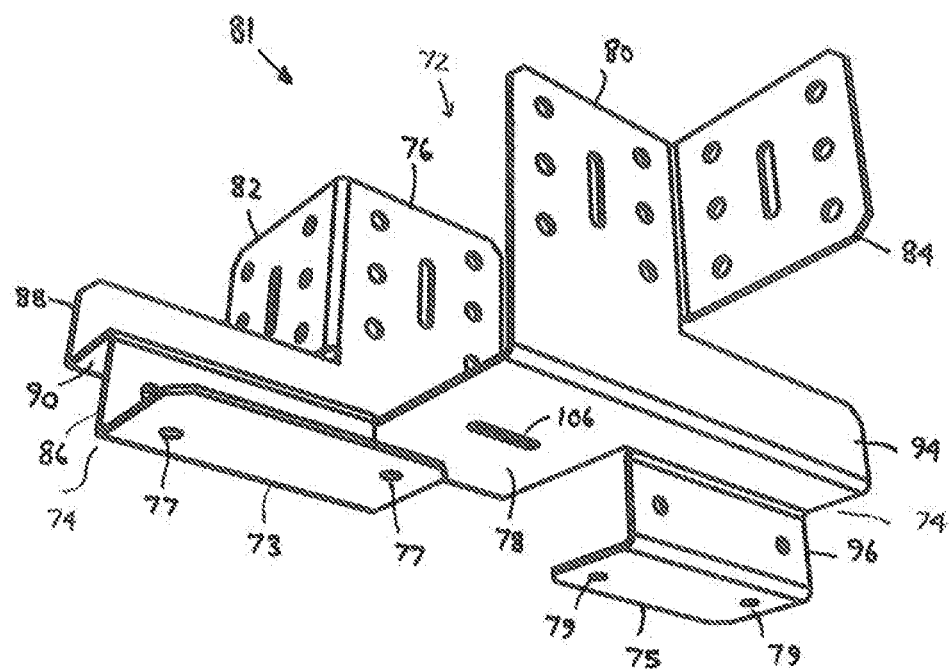
FIG. 7A is a perspective view from below of yet another further bracket assembly that can be used to connect to a wall or ceiling.
Figure 8A:
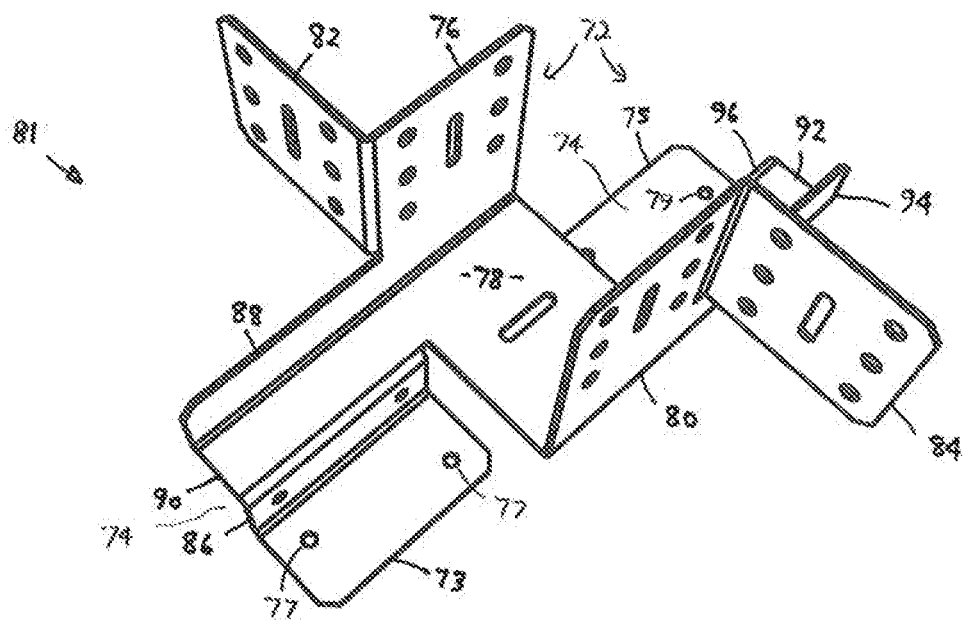
FIG. 8A is a perspective view from above of the bracket assembly in FIG. 7A.

In FIGS. 7A and 8A, there is shown a variation of the bracket assembly 70 respectively illustrated in FIGS. 7 and 8. Bracket assembly 81 has a dual purpose use, either for connecting a less-than-full-height-wall or a ceiling structure to a building structure, such as a roof or concrete slab. A first extension member or step 73 is connected to and protrudes perpendicularly from first depending portion 86 towards second protruding portion 80. A second extension member or step 75 is connected to and protrudes perpendicularly from second depending portion 96 towards first protruding portion 76. First step 73 has apertures 77 whereby suitable fasteners are used to connect the step 73 to a top portion, such as a web 41 of track 40 of a wall structure 3 (see FIG. 3). Second step 75 is aligned with step 73 in the same plane, and has apertures 79 through which suitable fasteners connect step 75 to the web 41 of track 40. In this manner, the bracket assembly 81 can be connected to the less-than-full-height-wall or to the ceiling structure, as described with reference to FIGS. 7 and 8, and shown connected in FIG. 9.

Figure 9:
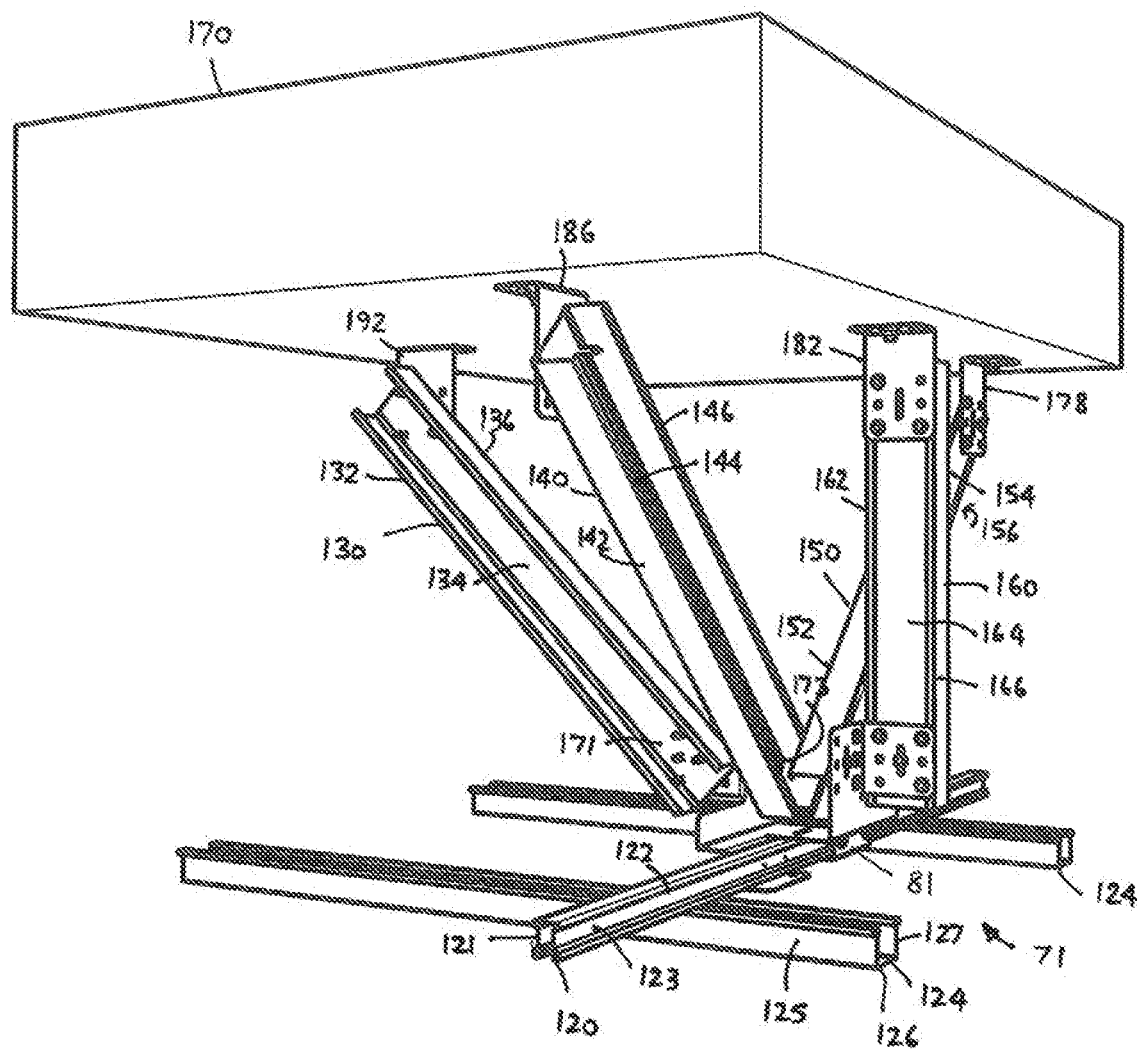
FIG. 9 is a perspective view showing the bracket assembly of FIG. 7A connecting a lower sub-assembly of a ceiling to one end of a number of bracing components and wherein the other end of each bracing component is connected to a building structure.
Figure 10:
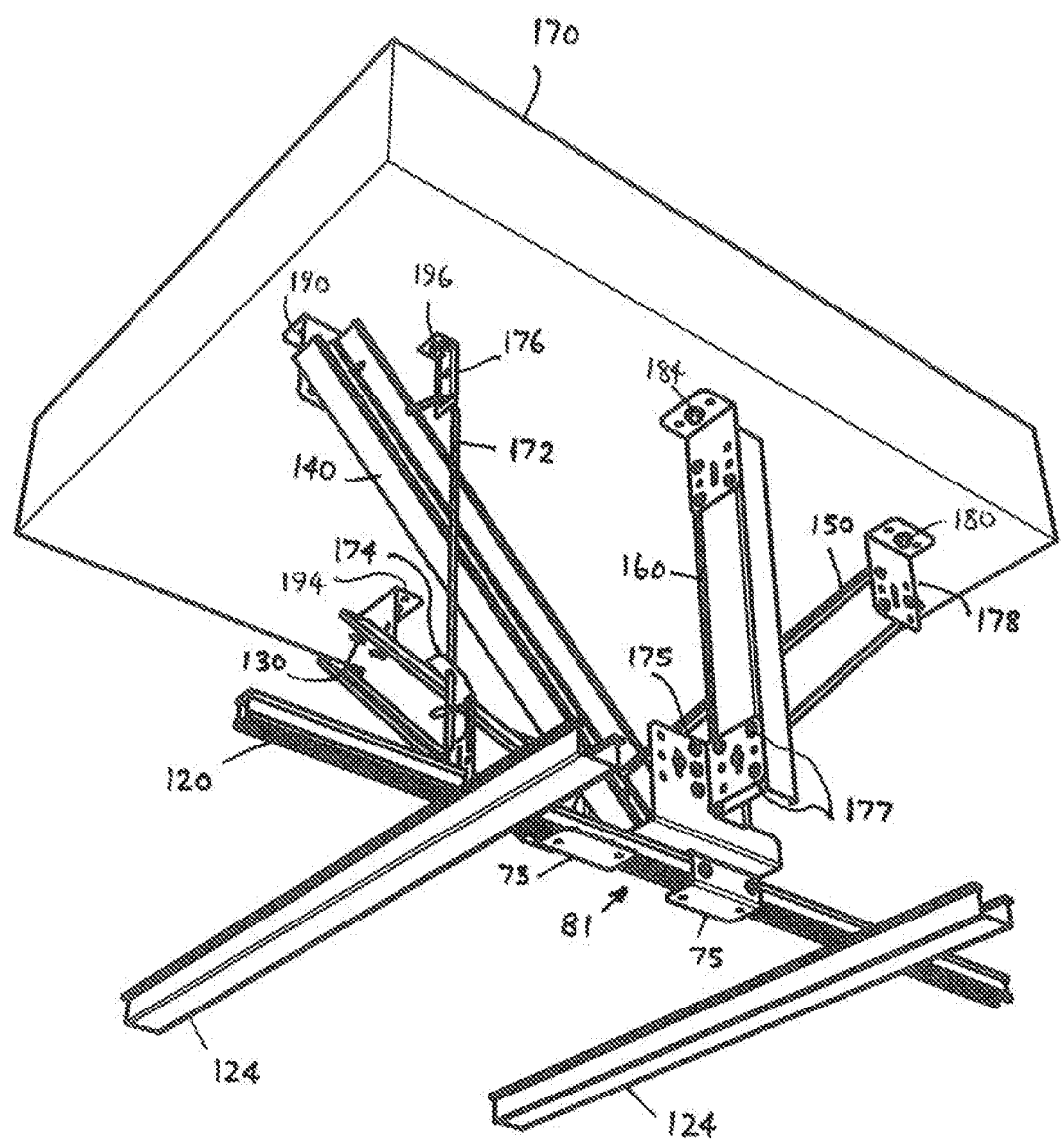
FIG. 10 is an underneath perspective view of the assembly shown in FIG. 9.

With reference to FIGS. 9 and 10 there is shown a bracket assembly 81 (assembly 70 applies equally) connecting part of the framework of the ceiling 71 (ceiling structure) to a series of bracing elements, in this case four such elements 130, 140, 150 and 160. One end of each of the elements 130-160 is connected to the bracket assembly 70 while the other end of each of the elements 130-160 is connected to a building structure, such as roof structure 170, through respective brackets 192, 186, 178 and 182. Bracing element 130 has web 134 and depending flanges 132, 136 connected by web 134. Bracing element 140 has web 144 and depending flanges 142, 146 connected by web 144. Bracing element 150 has web 154 and depending flanges 152, 156 connected by web 154, and bracing element 160 has web 164 and depending flanges 162, 166 connected by web 164.

Figure 11:
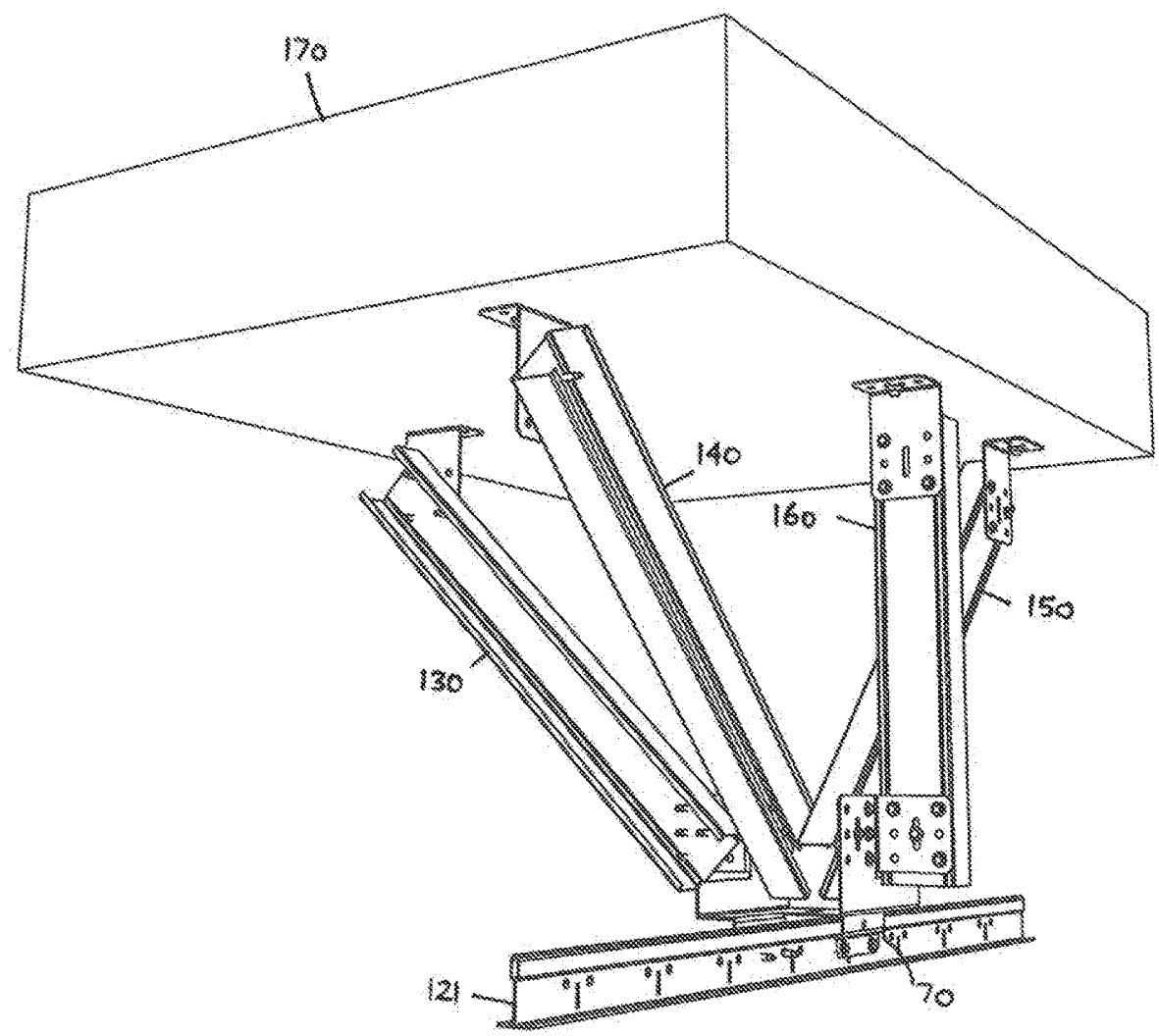
FIG. 11 shows the perspective view of the bracket assembly of FIG. 7 when connecting a T-bar grid ceiling system to a roof structure through a series of bracing components.

The ceiling framework 71 includes a series of channels or tracks 124 which are generally parallel to one another and connected perpendicularly to the tracks 124 are tracks or channels 120 (alternatively a T-bar shown in FIG. 11). The channels or tracks 120 and 124 each have a pair of legs joined by a web portion and are connected to the roof structure 170 through a rod 172. Each cross channel 120 is connected to a rod 172 through a bracket 174 and at the top of the rod 172 there is a connection to a further bracket 176 which is in turn connected to the roof structure 170 through connection 196. A series of such rods allow the formation of a suspended ceiling grid 71 and additional strength is provided through the bracket assembly 70 (or 81) which connects the grid 71 to a series of brace elements 130 to 160. Therefore in the event of a seismic occurrence the ceiling mass will be better placed to withstand the forces upon it and be able to hold the ceiling mass to the roof structure 170 and delay or prevent the collapse of the ceiling structure. Furthermore, with both the embodiments (wall and ceiling bracket assemblies) being made from steel, they are less susceptible to deformation or weakening during a seismic event.

Each of the bracing elements 130, 140, 150 and 160 are respectively connected to protruding portions 82, 76, 80 and 84 of the bracket assembly 70. Initially the respective slots 98, 100, 102 and 104 can be used to locate and temporarily affix their respective bracing elements until the desired angle of the elements 130-160 is reached. Each of the elements can move through an arc or up to 270°. Once a position is determined then the elements 130-160 are respectively fastened to the bracket assembly 70 (or 81) through a series of fasteners 171, 173, 175 and 177. The other end of the elements 130-160 are connected at their respective webs 134, 144, 154 and 164 to the brackets 192, 186, 178 and 182. This is done through suitable fasteners. In turn each of the brackets 192, 186, 178 and 182 are connected to the roof structure 170 through connectors 194, 190, 180 and 184 respectively. Each of the elements 130, 140 and 150 are shown connected between the respective brackets at an angle while bracing element 160 is connected between the roof structure 170 and bracket assembly 70 at right angles to the plane of the roof structure 170 and the plane of the channels 120.

Shown in FIG. 11 is a similar arrangement to that shown in FIGS. 9 and 10 except that instead of the channels 120, a T-bar 121 is used and connected between flanges 88 and 94 and fastened to depending portions 86 and 96 of the bracket assembly 70. Each of the elements 130-160 are connected at their webs to the respective portions of the bracket assembly 70 to provide additional strength to the overall structure in the case of seismic activity. Slot 106 in web 78 of the bracket assembly 70 is used to temporarily locate a fastener to a channel or bar 120 before finally affixing the bracket assembly 70 to the channel or bar 120 through the depending portions 86 and 96.

Figure 12:
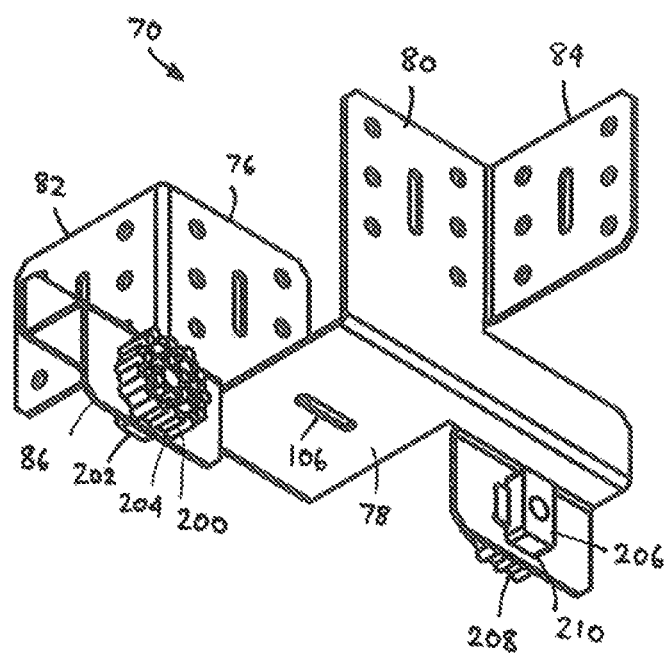
FIG. 12 is a perspective view from underneath of the bracket assembly of FIG. 7 having acoustic mount components fitted.

Referring to FIG. 12 there is shown bracket assembly 70 having acoustic mounts 200 and 210. Specifically, acoustic mount 200 has an interior portion 204 which abuts against a cross channel 120 and a smaller exterior portion 202. The acoustic mount 210 has an exterior portion 206 and a larger interior portion 208 which abuts against the cross channel 120. Both the acoustic mounts 200, 210 provide acoustic insulation against rubbing between the bracket assembly 70 and any cross channel that is connected between the portions 86 and 96.

Figure 13:
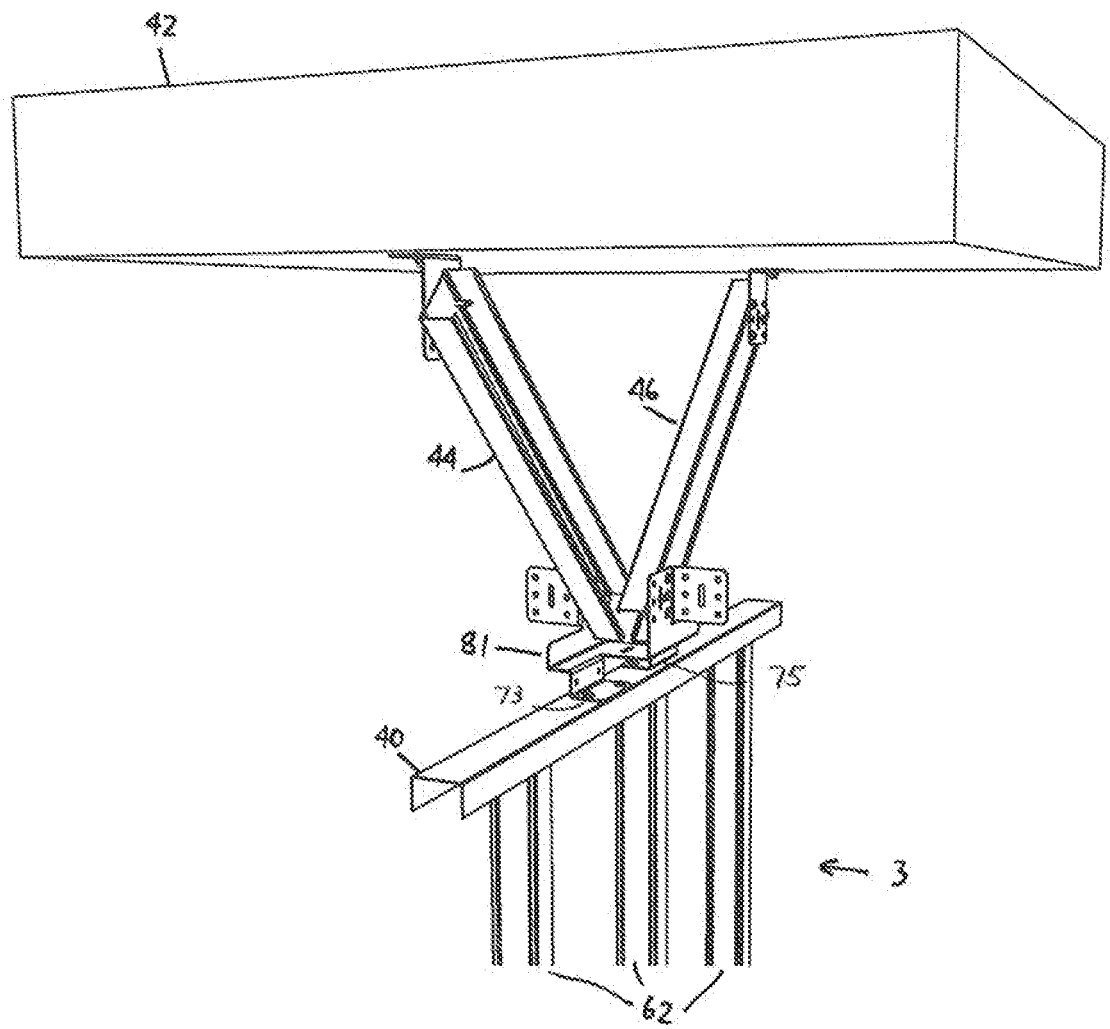
FIG. 13 is a perspective view of the bracket assembly of FIG. 7A shown in use connected to a wall structure and to a pair of bracing elements that also connect to a building structure.

FIG. 13 shows the bracket assembly 81 (dual use) connecting a wall structure 3 to a building structure 42, such as a roof structure, through bracing elements 44 and 46 as previously described. Portions 73 and 75 are secured to web 41 of top track or rail 40 through suitable fasteners.

The bracket assemblies in each of the embodiments are produced as a one-piece assembly with no joints or fixings. The apertures or holes in the bracket assembly protruding portions allow for a minimum of three such apertures to be available for fixing to a respective bracing element, irrespective of the rotational alignment of the bracing element. A single bracket assembly is suitable for use with either walls or ceilings without modification or adaptation.

In the ceiling version of the bracket assembly (FIG. 7), the screws or fasteners that fix the bracing elements to the bracket assembly are all located on the horizontal plane, removing the need to access this connection from above (at dangerous heights) or from below (difficult to access).

In the dual version, ceiling and wall, bracket assembly (FIG. 7A) the assembly allows for up to four bracing elements to be connected to it. The dual version bracket assembly accommodates a plurality of bracing elements without requiring any special end preparation to either end of the bracing elements, such as angled or mitred cuts. The bracket assembly, when installed in ceiling applications, has a secondary means of support, being portions 73 and 75, that allow the ceiling framework to continue to be supported in the case of the screw fixings failing during an earthquake event. In each of the assemblies, the angle of the bracing element is infinitely variable, with respect to the bracket assembly, in order to avoid services in the ceiling plenum.

In the wall version bracket assembly (FIG. 1), the bridging member 14 is an elongate plate, as opposed to a central cylindrical shaft which would otherwise provide a weak pivot point.

All of the bracing elements have the ability to move through arcs of up to 180 degrees before they are fixed in position.

The invention claimed is:

1. A bracket assembly for securing bracing elements to a building component, the assembly comprising:
   a first connecting portion having a joining portion and first, second and third protruding portions, each protruding portion adapted to connect to a respective bracing element;
   a second connecting portion having at least one depending portion and linked to said first connecting portion, said at least one depending portion adapted to connect to a building component;
   wherein said first and second protruding portions lie in opposing, spaced, parallel relation to one another;
   wherein said joining portion extends between and substantially perpendicular to said first and second protruding portions;
   wherein said third protruding portion connects to one of said first and second protruding portions; and
   wherein said third protruding portion extends substantially perpendicular to said joining portion and to said one of said first and second protruding portions.

2. The bracket assembly according to claim 1 wherein a first end of each bracing element is connectable to a respective protruding portion and a second end of each bracing element is connectable to the building structure.

3. The bracket assembly according to claim 2 wherein each bracing element prior to final connection with a respective protruding portion is rotatable with respect to said respective protruding portion.

4. The bracket assembly according to claim 3 wherein said rotation is up to 270 degrees.

5. The bracket assembly according to claim 3 wherein each protruding portion has a slot to enable adjustment of a bracing element with respect to a respective protruding portion.

6. The bracket assembly according to claim 1 further comprising one or more acoustic mounts.

7. The bracket assembly according to claim 1 wherein the building component is a less-than-full-height wall.

8. The bracket assembly according to claim 7 having two protruding portions respectively connectable to a bracing element at said first end of each bracing element, said protruding portions being substantially parallel to one another, and said joining portion joining said protruding portions being substantially perpendicular to said protruding sections.

9. The bracket assembly according to claim 8 further comprising a bridging member that joins the joining portion to said second connecting portion.

10. The bracket assembly according to claim 9 wherein said second connecting portion has first and second depending portions joined by a web, with said bridging member attached to or integrally formed with said web, each of the first and second depending portions are attachable to a top section of the less-than-full-height wall.

11. The bracket assembly according to claim 10 wherein each of the first and second depending portions have a slot such that before solid connection of the second connecting portion to the wall top section, the bracket assembly is adjustable in position with respect to the wall top section.

12. The bracket assembly according to claim 11 wherein the second connecting portion is substantially planar and the bridging member is substantially perpendicular to the second connecting portion.

13. The bracket assembly according to claim 7 further comprising a swivel connecting piece between the first and second connecting portions to enable rotation and a desired angle of alignment between the first and second connecting portions.

14. The bracket assembly according to claim 1 wherein the building component is part of a ceiling structure positioned adjacent to the building structure.

15. The bracket assembly according to claim 14 wherein the second connecting portion is integral with the joining portion, said second connecting portion having first and second depending portions connected to said joining portion through respective first and second segments.

16. The bracket assembly according to claim 15 wherein each of the depending portions are substantially perpendicular to said first and second segments and are fixable to a track or bar of the ceiling structure.

17. The bracket assembly according to claim 16 wherein said joining portion has a slot to enable adjustment of the bracket assembly with respect to the track or bar.

18. The bracket assembly according to claim 2, further comprising parts that enable connection to the building component where the building component is either part of a ceiling structure or is a less-than-full-height wall.

19. The bracket assembly according to claim 18 comprising at least three protruding portions respectively connectable to a bracing element at said first end of each bracing element, with at least two of the protruding portions being substantially parallel to one another joined by said joining portion, said joining portion being substantially orthogonal to the two protruding sections, a third protruding portion being substantially perpendicular to and connected to one of the other two protruding portions.

20. The bracket assembly according to claim 19 wherein the second connecting portion is integral with the joining portion, said second connecting portion having first and second depending portions connected to said joining portion through respective first and second segments.

21. The bracket assembly according to claim 20 comprising a first extension member extending from said first depending member and a second extension member extending from said second depending member to enable connection of the second connecting portion to a less-than-full-height wall.

\* \* \* \* \*